United States Patent [19]
Lampe et al.

[11] 3,933,401
[45] Jan. 20, 1976

[54] FOAMED POLY(VINYL CHLORIDE) DRAWER SIDES

[75] Inventors: John G. Lampe; Willie E. Wall, both of Thomasville, N.C.

[73] Assignee: Armstrong Cork Company, Lancaster, Pa.

[22] Filed: June 21, 1974

[21] Appl. No.: 481,699

Related U.S. Application Data

[63] Continuation of Ser. No. 127,258, March 23, 1971.

[52] U.S. Cl............ 312/330 SM; 161/166; 312/258
[51] Int. Cl.[2]................. A47B 47/04; A47B 88/00; A47B 96/20; B32B 7/02
[58] Field of Search...... 312/330; 108/150; 161/166

[56] References Cited
UNITED STATES PATENTS

| | | | |
|---|---|---|---|
| 2,274,765 | 3/1942 | Zalkind........................ | 312/330 UX |
| 2,899,708 | 8/1959 | Donaldson et al................. | 161/166 |
| 3,494,308 | 2/1970 | Perrin................... | 108/150 |
| 3,627,622 | 12/1971 | Vega............................... | 161/166 X |
| 3,658,972 | 4/1972 | Ready et al..................... | 161/166 X |

OTHER PUBLICATIONS
Modern Plastics, Apr., 1966, pp. 98–99.

Primary Examiner—Paul R. Gilliam
Assistant Examiner—Carl F. Pietruszka

[57] ABSTRACT

The rear and side panels of a drawer are formed from a single slab of foamed rigid poly(vinyl chloride) having a reinforcing densified core and a densified outer skin with a wood grain pattern thereon. A longitudinal groove is formed in one surface of the slab adjacent the bottom edge thereof, and two V-shaped grooves are cut across the width of the same surface at appropriate ultimate corner forming locations. Appropriate guide slots and drawer front fastening configurations are formed on the slab. The slab is heated and bent at the V-shaped groove locations to form the rear and side panels of the drawer. A drawer bottom panel is installed in the longitudinal groove adjacent the bottom edge of the rear and side panels and the drawer front is attached. The drawer looks, feels, sounds, and handles like wood, but is less expensive and has many desirable qualities not possessed by wood.

4 Claims, 4 Drawing Figures

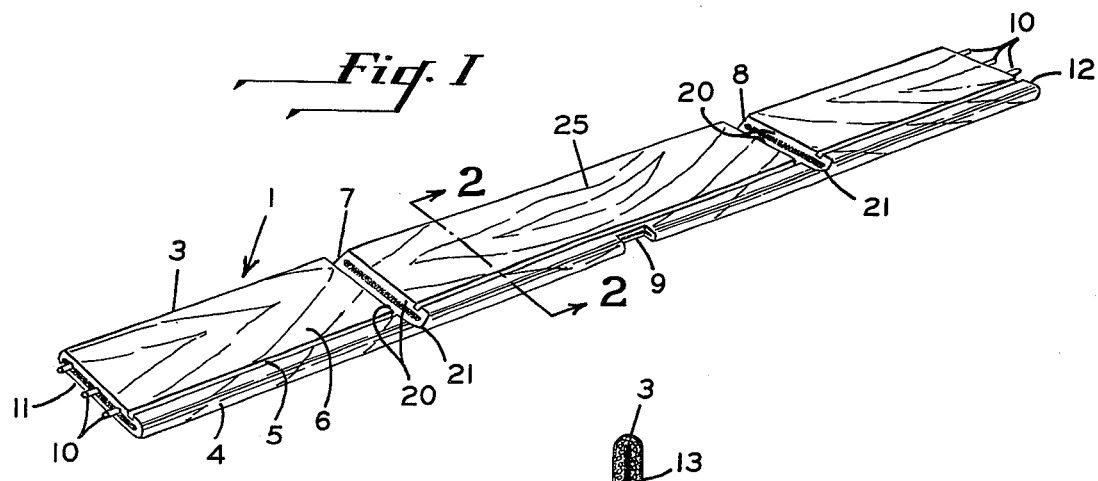
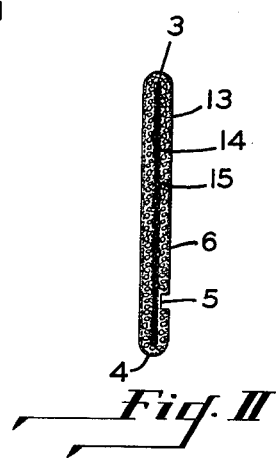
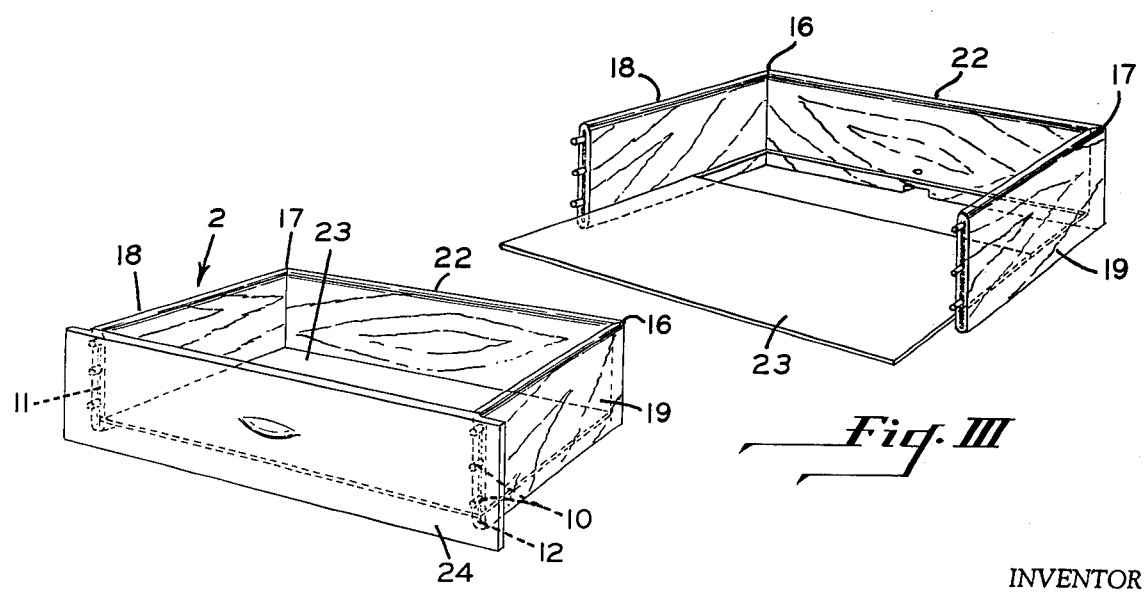
INVENTOR
JOHN G. LAMPE
WILLIE E. WALL
BY

FOAMED POLY(VINYL CHLORIDE) DRAWER SIDES

CROSS-REFERENCE TO RELATED APPLICATIONS

This application is related to application Ser. No. 123,739 filed Mar. 12, 1971, entitled "Method for Producing Thick, Reinforced, Cellular Slabs of Rigid Poly(Vinyl Chloride) by Extrusion," in the names of Andrew E. Graham, Jr., and Rickie L. Sitler and now U.S. Pat. No. 3,806,567.

This is a continuation of application Ser. No. 127,258, filed Mar. 23, 1971.

BACKGROUND OF THE INVENTION

1. Field of the Invention

This invention relates to a drawer having the rear and side panels thereof fabricated from a foamed plastic slab. More particularly, the invention relates to a drawer having rear and side panels made from a single slab of extruded foamed rigid poly(vinyl chloride) having a reinforcing dense core and a densified outer skin with a simulated wood grain pattern thereon.

2. Description of the Prior Art

The desirability of having a drawer or drawer frame which would be durable, inexpensive, require less storage space and be simple to fabricate and assemble has long been recognized.

Prefabricated plastic drawers have been produced in the past by deep drawing and injection molding processes. However, such methods required the use of a variety of expensive dies, molds and raw material. In addition, exorbitant shipping and storage space was required, and the drawers so formed looked, felt, sounded and handled like plastic.

An attempt to correct the foregoing problems is disclosed by U.S. Pat. No. 3,462,208, wherein a drawer form is fabricated from an extruded profiled sheet of plastic by cutting appropriately shaped blanks therefrom and bending the plastic to form a drawer having back and side walls integral with a bottom portion.

U.S. Pat. No. 3,312,516 also discloses a method for forming a plastic drawer wherein the back and side walls thereof are formed from an extruded profiled plastic board having an outwardly protruding channeled rib in its lower portion and an outwardly projecting flange at its upper edge. The profiled board is heated at the points which are to form the rear corners of the drawer, and the board is bent at these points to form the drawer frame. By this method, drawers of different sizes can be produced without changing the profile of the board by simply cutting it correspondingly.

While the foregoing inventions constitute an advance in the direction of providing an inexpensive, durable plastic drawer which would be easier to ship, store and assemble, there still remained the need for a drawer which would incorporate all of these good features and yet more closely resemble wood in appearance, size to weight ratio, feel, sound and thickness, and which could be worked like wood with normal wood-working tools.

SUMMARY OF THE INVENTION

It is an object of this invention to provide a plastic drawer which is inexpensive and durable, easy to ship, store and assemble. It is the further object to provide such a drawer which more closely resembles wood and which can be worked by use of regular wood-working tools and methods.

The foregoing and other objects are achieved by this invention which comprises a drawer structure having two side walls and a rear wall made of one continuous foamed rigid poly(vinyl chloride) board. The board used in this invention is produced by the method set forth in the abovementioned copending related application. The board may have rounded or square longitudinal edges, a dense reinforcing core and a dense outer skin which may completely envelop the board, all of which contribute to the structure's being sufficiently rigid and durable for extended use. A longitudinal groove is formed on one surface of the board adjacent the lower edge thereof to receive a drawer bottom panel after the board has been bent to form the drawer's rear and side panels. Two V-shaped grooves extend across the width of the board's inside surface defining the drawer's rear corner locations. A centering notch may be provided in the lower edge of the rear panel, or grooves may be provided in the outer surface of the side panels, all intended to function with cooperating drawer guide means provided on a drawer receiving structure. Drawer fastening means are provided on the front end portions of the side panels adapted to function with cooperating fastening means on a drawer front.

The foregoing construction provides a rigid, durable, relatively inexpensive drawer structure, which may be easily fabricated and assembled, stored and shipped, and which closely approximates wood in weight, feel, sound and looks. In addition, drawer size changes may be easily made by merely cutting and grooving the boards appropriately. Further, ordinary wood-working tools and techniques can be used to work on the boards.

BRIEF DESCRIPTION OF THE DRAWINGS

FIG. I is a perspective view of the machined and cut board used in construction of the drawer of this invention, with dowels inserted in the bored openings in the ends of the board;

FIG. II is a sectional view taken along line 2—2 of FIG. I and showing the structure of the board;

FIG. III is a perspective view showing the board of FIG. I folded to form the rear and side panels of a drawer with a drawer bottom panel partially inserted into its receiving groove in the board;

FIG. IV is a perspective view of the drawer structure of this invention, with the bottom fully installed and a decorative front panel mounted on the front of the drawer.

DESCRIPTION OF THE PREFERRED EMBODIMENT

As shown in FIG. I of the drawings, the foamed, reinforced board 1 used for forming the drawer 2 of this invention consists primarily of a rectangular slab having longitudinal edges 3 and 4. The board 1 is provided with a longitudinal groove 5 in the planar surface 6. The groove is interrupted by V-shaped grooves 7 and 8 which extend across the width of the board. A centering guide notch 9 is provided in the lower edge of the board 1, and dowels 10 are installed in holes previously bored in the ends 11 and 12 of the board 1. It will be understood that the longitudinal edges 3 and 4 of the board 1 may be machined into square edges, or one edge may be rounded and the other squared if this is desired.

Referring to FIG. II, it can be seen that the board consists of a densified outer skin 13 and a dense reinforcing core portion 14 which is surrounded by cellular layer 15. As previously stated, the board used in forming the drawer of this invention is provided by the method set forth in the above-mentioned copending application.

The board surfaces may be decorated by a wood grain pattern printed on one or both sides as desired. Or, the surfaces of the board may be embossed with a wood grain pattern by means of rollers or a flatbed press, for example. The surfaces may then be shade wiped with a dark ink followed by a clear coating. Alternatively, the surface embossed board may be sprayed with a finished coat of enamel paint. The board could even be colored.

In forming the drawer of this invention, the longitudinal groove 5 is formed on the surface 6 of the board 1 by routing or shallow ripping. The board is then cut to the desired length, and the notch 9 is then formed in the central lower edge 4 of the board 1 to ultimately serve as a centering guide adapted to function with cooperating guide members on a drawer receiving structure. Alternatively, grooves (not shown) may be formed in the outer surfaces of the side panels to function in a similar manner. V-shaped grooves 7 and 8 are cut across the width of the board's surface 6 at the predetermined locations of the ultimate rear corner portions 16 and 17, thus dividing the board into the three sections which ultimately form the rear and side panels of the drawer 2. Holes are bored in the end portions 11 and 12 of the board 1 to receive dowels 10. The dowels 10 are inserted in the holes and secured therein by means of a natural or synthetic glue. A natural or synthetic glue or a solvent welding composition is then applied to the slanting surfaces 20 of V-shaped grooves 7 and 8. The remaining portion 21 in the V-shaped groove areas may then be heated and the board 1 bent at these points to close the V-shaped grooves, thereby forming drawer corner portions 16 and 17 and the back 22 and sides 18 and 19 of the drawer 2. The drawer bottom panel 23 is then installed in the now continuous groove 5; and the drawer front 24, after having been appropriately bored for the dowel locations in end portions 11 and 12 of the board 1, is attached to the drawer by a dowel and glue joint. Obviously other types of well-known joints could be used to attach the drawer front to the sides thereof such as: lock joints, french dove tail (DADO), box joint, rabbetted joint, halfblind dove tail joint, etc. As previously stated, other guide modifications may be made to the board instead of the centering notch 9.

The above-described operations are amenable to automated mechanization thus making fabrication and assembly favorable from the manufacturing point of view.

What is claimed is:

1. A drawer comprising two side walls, an integral rear wall, a bottom and a front, said side walls and rear wall characterized in that they are made of one continuous foamed thermoplastic slab having a dense reinforcing core and a densified skin on the planar surfaces, said dense reinforcing core is centrally located and consists of consolidated portions of the foamed thermoplastic slab material, said resulting slab structure thereby being a three-part structure having a first densified core, secondly, a layer of foam material surrounding said core forming an annulus around the core, and a third part consisting of a densified skin substantially surrounding the densified core and foam material layer, said densified skin surfaces having a simulated wood grain, drawer bottom receiving means on the inner surfaces of said side walls and rear wall, bendable rear corner forming means joining said side walls and rear wall and spaced apart a distance equal to the length of the rear wall, a drawer bottom panel positioned in said bottom panel receiving means, drawer front fastening means on the end of said side walls, and a drawer front fastened to said ends of said side walls.

2. A drawer according to claim 1 wherein the foamed thermoplastic slab is made of rigid poly(vinyl chloride).

3. The drawer of claim 1 wherein the drawer bottom receiving means consists of a continuous groove disposed adjacent the lower edges of the wall surfaces.

4. The drawer of claim 1 wherein the bendable rear corner forming means comprises a pair of substantially V-shaped grooves extending across the width of the inner surface of said walls and partially through the thickness thereof.

* * * * *